3,640,916
FOAM PRODUCING COMPOSITIONS
Douglas W. Dill, Racine, Wis., assignor to
S. C. Johnson & Son, Inc., Racine, Wis.
No Drawing. Filed Dec. 16, 1968, Ser. No. 784,205
Int. Cl. C08f 15/40, 47/10, 47/16
U.S. Cl. 260—2.5 L                11 Claims

ABSTRACT OF THE DISCLOSURE

The disclosure relates to compositions and processes for forming cellular structures. The compositions comprise an emulsion of a synthetic organic polymer having a minimum film-forming temperature of less than about 25° C. and, dispersed in the emulsion, a volatile organic liquid which has a vapor pressure of at least about 2 p.s.i.a. at about 20° C.

BACKGROUND OF THE INVENTION

Field of the invention

This invention relates to novel foamed products and to processes for making and using the same.

Description of the prior art

Foamed materials, and particularly foamed, cellular products prepared from synthetic polymers, are known to possess certain desirable physical properties and physical appearance which have prompted their use in a number of areas. For example, foamed materials have heat and sound-insulating qualities, cushioning qualities and a pleasing texture. Accordingly, they are used as insulators, soundproofing materials, packaging materials, cushioning materials, floor and wall coverings and as decorative items.

The principal drawbacks to the use of these compositions have been the difficulties associated with their preparation. Heretofore, foamed materials have been generally prepared by processes such as by heating beads of polymer containing a dissolved, heat-sensitive blowing agent; by beating air into a dispersion of the polymer, using high-speed beaters; or by complex chemical reactions such as those employed in preparing foamed polyurethanes. None of these techniques is suitable for home use or for application in the field. As a result, such foamed materials have generally been prefabricated rather than prepared at the site of use, and this factor has limited the number of possible end-uses for the compositions.

SUMMARY OF THE INVENTION

The present invention provides novel compositions which are capable of producing stable, persistent foams without the need for elaborate equipment. The compositions of the invention can be packaged in a manner which permits their use in any location and by persons who are not technically trained. These compositions are especially suitable for home use.

In accordance with certain of its aspects, this invention provides a composition suitable for preparing a stable cellular structure which comprises an emulsion of a synthetic organic polymer having a minimum film-forming temperature (MFT) of less than about 25° C., having dispersed therein a foam-forming amount of at least one volatile organic liquid having a vapor pressure of at least about 2 p.s.i.a. at about 20° C.

It is a particular feature of this invention that the compositions described herein are capable of producing foams having almost any combination of desired physical characteristics and which quickly develop the necessary physical strength and freedom from tackiness to maintain their physical structure, without collapsing or dripping from vertical or overhead surfaces. In general, the compositions will be maintained in a confining container prior to use and will, when released or expelled from the container, spontaneously form a persistent, stable foam.

One of the principal components of the compositions is an emulsion of a synthetic organic polymer having an MFT of less than about 25° C. A method for determining MFT is found in J. Pol. Sci., vol. IV, Issue No. 10, pp. 81–85 (1960). An MFT of less than about 25° C. is desirable for the polymer component to form, at the temperature of application, the continuous, unified structure needed for good foam strength. It will be understood that the MFT of the polymer can be modified by the use of suitable, compatible plasticizers. Where such plasticizers are employed, the MFT of the unmodified polymer may be greater than 25° C. and the MFT of the plasticized polymer will be less than about 25° C.

The preferred polymer components are emulsions of acrylic polymers, and most preferably polymers which comprise in predominant amount at least one "soft" monomer. Soft monomers are those monomers which produce flexible homopolymers having a brittle point below about 20° C. The most useful soft monomers are the alkyl esters of acrylic acid, exemplified by methyl acrylate, ethyl acrylate, butyl acrylate, hexyl acrylate, 2-ethylhexylacrylate, etc., and the higher alkyl esters of methacrylic acid, exemplified by butyl methacrylate, 2-ethylhexyl methacrylate and lauryl methacrylate, etc. The preferred soft monomers are butyl acrylate, ethyl acrylate and 2-ethylhexyl acrylate. Mixtures of two or more of such monomers can be used. The soft monomer will generally be present in at least a major amount, i.e., it will constitute at least about 50% by weight of the polymer composition. When a plasticizer for the polymer is present, lower proportions of soft monomer can be used.

In addition to the soft monomer, the polymer component may contain one or more comonomers, the total comonomer content preferably being less than about 50%. Particular comonomers can be included to adapt the composition to particular end uses. For example, "hard" monomers such as methyl methacrylate, cyclohexyl acrylate, cyclohexyl methacrylate, styrene, acrylonitrile, etc. can be incorporated for the purpose of toughening the final product or producing a firmer foam. The preferred hard monomers are methyl methacrylate and acrylonitrile. Acid-containing monomers such as methacrylic acid, acrylic acid, maleic acid, itaconic acid, monoalkyl itaconates, etc. may be incorporated into the polymer to provide rapid development of structural strength, especially when cross-linked with polyvalent metal ions. The preferred acid monomer is methacrylic acid. In general, the hard comonomer will be present in an amount not greater than about 50% by weight, and preferably about 15 to 45% by weight; and the carboxylic acid comonomer will be present in an amount not greater than about 30% by weight, and preferably 5 to 20% by weight; the total of the acid and hard comonomers being not greater than about 50% by weight of the polymer composition. These ranges will produce the physical properties normally desired in a foam product. In exceptional cases, such as where very dry firm foams are desired or large amounts of plasticizer can be employed, larger proportions of acid and hard comonomers can be used.

The polymers are conveniently prepared in accordance with known emulsion polymerization techniques, using free radical initiators. The polymers containing acid comonomers will generally have some degree of self-emulsifying capability, but, in all cases, the use of surfactants or dispersing agents is desirable to improve the stability of the emulsion. The preferred wetting or dispersing agents are nonionic and anionic surfactants. Suitable nonionic surfactants include the ethylene oxide adducts of hydrophobic compounds such as nonyl phenol. Suitable anionic surfactants include the ethylene oxide adducts of hydrophobic compounds such as nonyl phenol. Suitable anionic surfactants include the long-chain alkyl sulfonates and sulfates such as sodium myristyl sulfate. It is preferred that the emulsion contain a high proportion of non-volatiles. For example, a minimum polymer solids content in the final composition of at least about 15% by weight is generally preferred, with values of 40% or more being desirable for certain applications. Emulsions suitable for making such high-solids compositions are prepared by known techniques. It is also preferred to carry out the polymerization to obtain polymers of high molecular weight, of the order of about 100,000 to about 500,000 or more.

Representative polymers falling within the above description are given in the following table, wherein the numbers in the tabulation are percent by weight.

| Soft monomer | Hard monomer | Acid monomer |
| --- | --- | --- |
| Ethyl acrylate-100 | | |
| 2-ethylhexyl acrylate-100 | | |
| Butyl acrylate-100 | | |
| Ethyl acrylate-75 | Methyl methacrylate-25 | |
| Butyl acrylate-65 | Methyl methacrylate-35 | |
| 2-ethylhexyl acrylate-55 | Methyl methacrylate-30 | Methacrylic acid-15. |
| 2-ethylhexyl acrylate-45/butyl acrylate-15. | Methyl methacrylate-25 | Do. |
| 2-ethylhexyl acrylate-70 | Methyl methacrylate-20/styrene-10 | |
| 2-ethylhexyl acrylate-60 | Methyl methacrylate-20/acrylonitrile-5. | Methacrylic acid-15. |
| 2-ethylhexyl acrylate-55 | Methyl methacrylate-15/acrylonitrile-15. | Do. |

The polymers containing acid monomers are especially useful since the pendant carboxyl groups can be cross-linked with polyvalent metal ions. Such cross-linking contributes to both the ultimate strength of the foam and to the speed which the foam "sets-up" or reaches a state of sufficient strength to withstand physical deformation. It also gives reduced "tack-free times." The preferred metal cross-linking agent are complexes of polyvalent metal ions such as zirconium, zinc, cadmium, copper or nickel, with volatile complexing agents such as ammonia or a volatile amine, together with anions such as carbonate or acetate. The nature and use of illustrative complex cross-linking agents are particularly described in U.S. Pat. 3,308,078 to Rogers et al., and U.S. Pat. 3,320,169 to Rogers, the disclosures of which are incorporated herein by reference. Polyvalent metal complexes, when present, will ordinarily be used in amounts of the order of about 0.05 to about 0.5, say 0.125, mole per equivalent of free carboxyl group in the polymer. Other cross-linking agents, such as the calcium or magnesium sulfate, acetate or chloride, or polyamines such as diethylene triamine, can also be used.

In addition to the polymer component, the compositions of the invention will contain at least one volatile organic liquid having a vapor pressure of at least about 2 p.s.i.a. at about 20° C. The organic liquid will also be insoluble in water and inert, i.e., will not react, complex or otherwise interfere, with the other components of the composition. The particular organic liquid employed will depend upon the particular desired end use. In applications where it is desirable that a foam be generated after the composition is applied to a surface, volatile liquids having a relatively low vapor pressure, say 2 to 15 p.s.i.a., are preferably incorporated. Examples of suitable volatile liquids for this purpose are hydrocarbons such as hexane, pentane, 2-methylbutane, 1-pentene, 2-methyl-2-butene, cyclopentane, cyclohexane, etc., and halogenated hydrocarbons such as trichlorofluoromethane, carbon tetrachloride, trichloromethane, dichloromethane, 1,1,1-trichloroethane, 1,1 or 1,2-dichloroethane (1,1 or 1,2), ethyl bromide, 1 or 2-chloropropene, 1 or 2-bromopropane, 1 or 2-chloropropane, trichlorotrifluoroethane, etc. The preferred low vapor pressure liquids are pentane, hexane, trichlorofluoromethane, trichlorotrifluoroethane and mixtures thereof.

Where the volatile organic liquid is utilized as the means for expelling the composition from its container, it is desirable that at least a portion thereof be a liquid having a relatively high vapor pressure, of the order of 15 to 140 p.s.i.a. at about 20° C. Examples of such liquids are the liquefied hydrocarbon propellants and liquefied fluorinated hydrocarbon propellants used to prepare self-pressurized formulations. Suitable hydrocarbons are exemplified by propane, n-butane, isobutane, etc. Suitable fluorinated propellants are exemplified by dichlorodifluoromethane, difluoroethane, chlorodifluoromethane, chlorodifluoroethane, octafluorocyclobutane, dichlorotetrafluoroethane (sym. or assym.), chlorotrifluoroethane, dichloromethane, etc. The preferred high vapor pressure liquids are propane, butane, isobutane, dichlorodifluoromethane, sym. dichlorotetrafluoroethane, and mixture thereof.

The volatile organic liquid will be present in a foam-forming amount, i.e., in an amount sufficient to produce the desired cellular structure. In general, the volatile organic liquid will be used in an amount of about 1 to about 15% by weight, and preferably about 3 to about 6% by weight, based on the weight of the total composition. The precise value chosen will depend upon the viscosity of the composition, the vapor pressure of the liquid, the type of foam desired, and similar factors. Higher amounts of volatile organic liquid are employed when foams of low density are to be prepared. Lower amounts of volatile organic liquid are used to produce firmer, denser foams. The combination of high amounts of organic liquid, together with low solids in the polymer emulsion, produces a novel decorative finish having open pores and a random pattern of voids. High polymer solids coupled with low levels of organic liquid result in uniform foams of predominantly closed cell structure.

In most cases, it will be found convenient to emulsify the volatile organic liquid with the polymer emulsion. Depending upon such factors as viscosity of the phases, the presence of and nature of auxiliary dispersing agents, and specific gravity of the organic liquid, the emulsions formed will have varying degrees of stability. When the emulsion has a relatively low order of stability, it will be desirable to agitate the composition immediately prior to use.

The volatile organic liquid and the polymer emulsion may, if desired, be premixed in a confining container or the two components may be separately packaged and mixed together immediately prior to application. Depending upon the vapor pressure of the volatile organic liquid, the mixing together just prior to application may be carried out in an open container, by metering two streams of the two components in a spray device, etc.

In addition to the polymer emulsion and volatile organic liquid, the compositions of the invention can contain other components for various purposes. As noted previously, complexes of polyvalent metal ions with ammonia or volatile amines can be employed to provide cross-linking. Foaming agents, cell modifiers, foam-structuring agents such as fatty acids and fatty alcohols, and the like can be included for the purpose of modifying the structure of the foam. Dyes or pigments may be used for decorative or functional reasons. Fragrances, insecticides, fungicides or other active materials can be incorporated for controlled release from the foamed composition. Stabilizers for the polymer may be included. Thickeners can be used to control the viscosity of the composition and the resulting foam structure. Fillers such as carbon black, silica or the like can be present. Reinforcing agents such as short fibers, linters or similar materials are often useful. Metal powders can be used for special decorative effects or to produce a magnetic coating. Compatible polyhydric alcohols such as ethylene glycol and propylene glycol are added to improve freeze-thaw stability and application characteristics.

The compositions of the invention are compatible with various convenient packaging techniques. For example, they can be packaged in pressurized containers, in which case part or all of the volatile organic liquid can be a liquefied gaseous propellant, as previously described.

The compositions can be packaged in any accepted container for pressurized materials, including metal cans, glass bottles and reinforced plastic containers of any desired size. The containers will be fitted with valve and dispensing assemblies suitable for the production of foam, such as narrow or wide orifice foam heads or actuators designed to produce the foam upon impingement. The containers may be fitted with dip tubes or designed to be inverted during use.

A further method for producing persistent foams in accordance with the practice of this invention involves the use of spraying equipment, exemplified by a spray gun or the like. In this variation, the volatile organic liquid may supply part or all of the pressure used to expel the composition, or the necessary force may be supplied, in whole or in part, by compressed air or the like. In the latter case, the volatile organic liquid will be one having a relatively low vapor pressure, say less than 10 p.s.i.g., at 20° C. Spraying techniques are most suitable for covering large areas, such as where the foamed compositions are to be applied for insulating or decorative purposes. In such applications, it is generally preferred that the foaming take place after impingement of the composition upon the surface to be covered, and it is therefore desirable to select volatile organic liquids having a relatively low vapor pressure, of the order of about 2 to about 15 p.s.i.a. at 20° C.

As a further alternative, the compositions can be packaged in collapsible tubes, in which case the volatile organic liquid will be one having a relatively low vapor pressure at about 20° C. The compositions may also be mixed in an open container and may be brushed or otherwise applied to the surface to be treated. In this latter variation, it may be desirable to chill the container to inhibit development of the foam prior to application.

It will be understood that further variations can be made without departing from the scope of the invention. For example, an increase in the temperature of the application environment or the surface to be treated permits the use of volatile organic liquids of lower vapor pressure and polymers of higher MFT than those hereinbefore described. Similarly, a decrease in temperature makes it desirable to employ lower MFT polymers and higher vapor pressure liquids.

The compositions are suitable for a very wide variety of uses. The foams produced generally reach a tack-free state within a reasonably short time, say 1 to 3 hours, after application and are, therefore, especially convenient for home applications. The compositions are useful as art media, particularly as textured surface decoration or free-standing, moldable articles. They are suitable for children's toys. They can be used to form insulating coatings on pipes, heaters and the like or to prepare cushioning coatings for furniture items or irregular items requiring protection during shipping. They are also useful as sealing coatings for porous masonry, as caulking materials, as paper coatings, and as adhesives. As has been explained previously, the stiffness, porosity, cell structure, tack-free time and application characteristics of the compositions can be tailored to each of these uses by proper selection of the polymer composition, volatile organic liquid, solids, amount of volatile liquid, surfactant and additive.

Practice of specific embodiments of the invention may be observed from the following illustrative examples. In all examples, amounts are given in parts by weight unless otherwise specified.

EXAMPLE 1

Concrete block filler

The following composition is prepared, the n-hexane being added last:

Composition

| | |
|---|---:|
| Acrylic emulsion polymer 50% solids (60% 2-ethylhexyl acrylate, 25% methylmethacrylate, 15% methacrylic acid) | 41.7 |
| Water | 38.5 |
| Ammonium zirconyl carbonate solution (10% $ZrO_2$) | 8.4 |
| Propylene glycol | 5.0 |
| Activated clay | .5 |
| Ammonium hydroxide (28%) | .9 |
| n-Hexane | 5.0 |
| | 100.0 |

Immediately after the hexane has been added and mixed in, the composition is brushed over porous concrete block or similar substrates. The composition expands due to the volatilization of the hexane and rapidly dries to give a uniform smooth surface. The smooth apperance is readily distinguishable from that produced by previously used block filler compositions which generally are subject to marked shrinkage, so that the dried coating has a pockmarked appearance reflecting the surface of the underlying substrate.

EXAMPLE 2

Decorative coating

The following composition is prepared and applied to a wall surface by means of a pressure-type spray gun:

Composition

| | |
|---|---:|
| Acrylic emulsion tetrapolymer 50% solids (55% 2-ethylhexylacrylate, 15% methylmethacrylate) (15% acrylonitrile, 15% methacrylic acid) | 43.3 |
| Water | 40.9 |
| Propylene glycol | 2.2 |
| Activated clay | .5 |
| Ammonium zirconyl carbonate solution (10% $ZrO_2$) | 6.8 |
| Diethylene triamine | .9 |
| Green aqueous color dispersion | .4 |
| Pentane | 5.0 |
| | 100.0 |

Immediately after application, the composition forms a uniform translucent coating which begins to foam within one or two minutes, depending upon the ambient temperature. After about one hour, the foam is dry to the touch and forms an opaque green coating. During drying, a film surface phenomenon takes place so that a random reticulated pattern forms on the entire surface of the foam giving a softening attractive appearance to the coating. The degree of reticulation can be adjusted through formulation changes. A reduction of non-volatile content or increase in blowing agent content will significantly increase the amount of reticulation. This type of coating is also applicable for factory-applied coatings to wall paper, gift wrap and other substrates designed for decorative purposes.

EXAMPLE 3

Self-pressurized art medium

The following composition is prepared and packaged in an aerosol container fitted with a standard foam head:

Composition

| | |
|---|---|
| Acrylic emulsion polymer (as in Example 1) 50% solids | 44.75 |
| Water | 47.36 |
| Zinc acetate | .27 |
| Propylene glycol | .90 |
| Ammonium hydroxide (28%) | 2.52 |
| Yellow aqueous color dispersion | .35 |
| Dichlorotetrafluoroethane | 3.85 |
| | 100.00 |

The composition is expelled slowly from the container in the form of a creamy yellow foam. It is either allowed to rise naturally or is spread with brushes, rollers, spatula or fingers to achieve the desired effect. The composition has a slow rate of drying and can therefore be manipulated as desired. After drying, the foam is persistent and water-resistant and undergoes little shrinkage. Similar formulations can be employed as caulking or insulating materials.

EXAMPLE 4

Quick-drying art medium

The following composition is prepared and packaged in an aerosol container fitted with a conventional foam head:

Composition

| | |
|---|---|
| Acrylic emulsion polymer (as in Example 1) 50% solids | 78.18 |
| Zinc acetate | 3.91 |
| Ethoxylated lauryl alcohol | 1.96 |
| Sodium lauroyl sarcosinate | 2.10 |
| Coconut alkanolamide | 1.31 |
| Ammonium hydroxide (28%) | 3.37 |
| Water | 5.05 |
| Carbon black aqueous dispersion | .27 |
| Propellant blend (83% isobutane/17% propane) | 3.85 |
| | 100.00 |

The composition is used similarly to that of Example 3 and produces a black foam of lower density with larger voids. The foam produced dries within about 15 minutes with almost no shrinkage during drying.

EXAMPLE 5

General purpose coating

The following composition is prepared and packaged in an aerosol container fitted with a conventional spray head:

Composition

| | |
|---|---|
| Acrylic emulsion polymer (as in Example 1) 50% solids | 45.3 |
| Water | 40.6 |
| 1 molar zinc ammonium acetate solution | 6.9 |
| Ammonium hydroxide (28%) | 2.4 |
| Propylene glycol | 1.0 |
| Propellant blend (83% isobutane/17% propane) | 3.8 |
| | 100.0 |

The composition is expelled from the container as a wet spray which, after impinging on a surface, develops into a fine-textured foam which dries quickly to a soft, white, resilient, opaque coating. The whiteness and opacity are due to the light-scattering effect of the entrapped bubbles rather than pigmentation, although pigments can be added if desired. The coatings are particularly useful for insulating or decorative purposes. When relatively thick coatings are applied, the resulting appearance is that of a continuous lower layer of fine-textured foam and an upper layer similar to that produced by the composition of Example 2.

EXAMPLE 6

Phosphorescent foam

The following composition is prepared and placed in a sealed container fitted with a nitrogen-activated piston to expel the contents:

Composition

| | |
|---|---|
| Acrylic emulsion polymer (as in Example 1) 50% solids | 38.28 |
| Phosphorescent pigment (Helecon 2330) | 28.73 |
| Water | 21.20 |
| Ammonium hydroxide (28%) | 2.29 |
| Microcrystalline cellulose | .37 |
| Carboxymethylcellulose | .09 |
| Propylene glycol | .75 |
| 1 molar zinc ammonium acetate solution | 5.80 |
| 10% ammonium oleate solution | .62 |
| Pentane | 1.87 |
| | 100.00 |

Prior to expulsion from the container, the composition exists as a paste or semi-gel of sufficient viscosity to prevent settling of the dispersed pigment. Activation of the piston forces out a portion of the paste, which then expands to about 5 to 10 times its original volume. The dispersion of the pigment throughout the body of the foam substantially enhances its effectiveness. This composition is particularly suitable for producing phosphorescent markings of various types.

EXAMPLE 7

Cushioning and insulating coating

The following composition is prepared:

Composition

| | |
|---|---|
| Acrylic emulsion polymer (as in Example 1) 50% solids | 79.5 |
| Zinc acetate | 4.0 |
| Polyoxyethylene lauryl ether | 2.0 |
| Lauric acid diethanol amine condensate | 1.6 |
| Sodium lauroyl sarcosinate | 2.0 |
| Propylene glycol | 1.5 |
| Silica | .4 |
| Water | 4.0 |
| Pentane | 5.0 |
| | 100.0 |

The pentane is added and mixed in just prior to application of the coating, and the composition is applied to a surface, whereupon it spontaneously expands to form a relatively coarse-textured foam. The foam dries quickly to give a resilient coating which performs well for cushioning or insulating purposes.

EXAMPLE 8

Decorative foam

The following composition is prepared and packaged in an aerosol container:

Composition

| | |
|---|---:|
| Acrylic emulsion polymer (as in Example 1) 50% solids | 44.44 |
| Water | 42.45 |
| Ammonium hydroxide (28%) | 1.50 |
| 1 molar zinc ammonium acetate solution | 7.05 |
| Cetyl alcohol | .55 |
| Microcrystalline cellulose | .01 |
| 10% ammonium oleate | .05 |
| Propylene glycol | .05 |
| Dichlorotetrafluorethane | 3.90 |
| | 100.00 |

Upon expulsion from the container, this composition forms a very soft, very white foam suitable for various decorative purposes. A mass of this foam can be chopped, cut or torn into small pieces which are useful as artificial snow.

EXAMPLE 9

Fiber-reinforced foam

The following composition is prepared, the trichloromonofluoromethane being mixed in immediately prior to application:

Composition

| | |
|---|---:|
| Commercial acrylic paint latex [1] 46% solids | 54.7 |
| 10% colloidal alumina slurry (Baymal-Du Pont) | 27.7 |
| Acrylic fiber flock | 5.0 |
| 25% sodium lauryl sulfate solution | .1 |
| Ammonium hydroxide | .1 |
| Trichloromonofluoromethane | 12.4 |
| | 100.0 |

[1] Sold under the trademark Rhoplex AC–34.

This composition forms a foam of improved structural strength due to the reinforcing effect of the dispersed fibers.

EXAMPLE 10

The following composition is prepared and packaged in an aerosol container:

Composition

| | |
|---|---:|
| Acrylic emulsion polymer 40% solids (55% 2-ethylhexylacrylate, 33% methylmethacrylate, 12% methacrylic acid) | 54.6 |
| 1 molar zinc ammonium acetate solution | 5.3 |
| Water | 31.4 |
| Ammonium hydroxide (28%) | .7 |
| Propylene glycol | .8 |
| Carboxymethyl cellulose | .1 |
| Microcrystalline cellulose [1] | .5 |
| Propellant blend (83% isobutane/17% propane) | 4.3 |
| | 100.0 |

[1] Sold under the trademark Avicel RC.

The foam produced with this composition is similar in properties and uses to that of Example 5, with the microcrystalline cellulose serving as a structuring and nucleating aid.

EXAMPLE 11

Insulating foam

The following composition is prepared and packaged in an aerosol container fitted with a conventional foam head:

Composition

| | |
|---|---:|
| Acrylic emulsion polymer 40% solids (60% 2-ethylhexylacrylate, 23% methylmethacrylate, 17% methacrylic acid) | 55.2 |
| Water | 28.4 |
| 1 molar zinc ammonium acetate solution | 7.4 |
| Ammonium hydroxide | 3.0 |
| Propylene glycol | .9 |
| 10% ammonium oleate | .7 |
| Microcrystalline cellulose | .4 |
| Carboxymethylcellulose | .1 |
| n-Butane | 3.9 |
| | 100.0 |

The product expelled from the container is a relatively wet foam which can be readily spread over various surfaces, such as water pipes, to produce an insulating coating after drying.

EXAMPLE 12

Fluorescent-pigmented foam

The following composition is prepared and packaged in an aerosol container:

Composition

| | |
|---|---:|
| Arcylic emulsion polymer (as in Example 1) 50% solids | 40.47 |
| Water | 43.51 |
| Orange-Red Day Glo pigment (Velva Glo P-1700–614) | 5.30 |
| Ammonium hydroxide (28%) | 3.08 |
| Zinc acetate | .60 |
| Microcrystalline cellulose | .40 |
| Cellulose gum | .10 |
| Ammonium oleate | .06 |
| Surfactant | .81 |
| n-Butane | 5.67 |
| | 100.00 |

Because of the high level of fluorescent pigment present, the foams produced from this composition are suitable for reflective markings, lettering on signs, and the like.

EXAMPLE 13

Plasticized foam

The following composition is prepared and packaged in an aersol container:

Composition

| | |
|---|---:|
| Acrylic emulsion polymer 50% solids (50% 2-ethylhexylacrylate, 25% methylmethacrylate, 15% acrylonitrile, 10% methacrylic acid) | 44.2 |
| Ammonium hydroxide (28%) | 2.3 |
| Water | 40.0 |
| 1 molar zinc ammonium acetate solution | 6.7 |
| Propylene glycol | .9 |
| Butyl benzyl phthalate | 2.0 |
| Propellant blend (83% isobutane/17% propane) | 3.9 |
| | 100.0 |

The combination of a relatively high MFT (25° C.) polymer with a compatible phthalate plasticizer gives a foam similar to that of Example 5.

EXAMPLE 14

Brushing coating

The following composition is prepared, the 1,1,2-trichlorotrifluoroethane being mixed in just prior to application:

Composition

| | |
|---|---|
| Acrylic emulsion polymer 50% solids (as in Example 13) | 64.8 |
| Water | 12.1 |
| 22% zirconium acetate solution | 5.9 |
| Sodium lauroyl sarcosinate | 1.6 |
| Ethoxylated lauryl alcohol | 2.2 |
| Butyl benzyl phthalate | 1.6 |
| Rayon fibre flock | 7.0 |
| 1,1,2-trichloro-1,2,2-trifluoroethane | 4.8 |
| | 100.0 |

The composition is readily applied by brushing onto the desired surface. Alternatively, it is mopped, troweled, rolled or poured onto the surface, depending upon the coating thickness desired. Foaming takes place after application to give a uniform, plasticized fiber-reinforced foam coating.

EXAMPLE 15

Wear-resistant foam

The following composition is prepared and packaged in an aerosol container fitted with a spray head:

Composition

| | |
|---|---|
| Acrylic emulsion tetrapolymer (as in Example 2) | 44.2 |
| Water | 41.4 |
| Propylene glycol | 2.4 |
| Diethylenetriamine | .9 |
| Ammonium zirconyl carbonate solution (10% $ZrO_2$) | 7.1 |
| Black aqueous color dispersion | .1 |
| Propellant blend (83% isobutane/17% propane) | 3.9 |
| | 100.0 |

This formulation produces foams having exceptional toughness and resistance to wear and water. Accordingly, it is suitable for the preparation of a wide variety of insulating and cushioning coatings, including temporary floor coverings. Multiple coats can be applied to increase the protection obtained. The coatings can be removed, if desired, by treatment with ammonia.

The foam can be tinted black, as in the present example, or any other desired color. It has a generally smooth and uniform top skin.

EXAMPLE 16

Wear-resistant foam

The following composition is prepared for application by means of a pressure-fed spray gun:

Composition

| | |
|---|---|
| Acrylic emulsion tetrapolymer (as in Example 2) | 52.3 |
| Water | 31.0 |
| Propylene glycol | 2.7 |
| Diethylenetriamine | 1.1 |
| Ammonium zirconyl carbonate solution (10% $ZrO_2$) | 8.2 |
| Pentane | 4.7 |
| | 100.0 |

Except for the method of application, this composition is generally similar in properties and uses to that of Example 15. The foam produced has an exceptionally smooth top skin.

EXAMPLE 17

Low solids composition

The following composition is prepared:

Composition

| | |
|---|---|
| Acrylic emulsion tetrapolymer (as in Example 2) 50% solids | 32.4 |
| Water | 55.8 |
| Proplene glycol | 1.6 |
| Zinc ammonium carbonate solution (7.1% ZnO) | 5.1 |
| Ammonium hydroxide (28%) | .4 |
| Pentane | 4.7 |
| | 100.0 |

Because of its low solids content, this composition produces relatively thin, highly porous coatings. These coatings have especially good color stability.

EXAMPLE 18

Non-crosslinked foam

The following composition is prepared:

Composition

| | |
|---|---|
| Acrylic emulsion polymer (as in Example 1) 50% solids | 46.50 |
| Water | 43.66 |
| Ammonium hydroxide (28%) | 2.25 |
| Propylene glycol | 1.11 |
| 10% ammonium oleate | .96 |
| Microcrystalline cellulose | .60 |
| Sodium salt of polymeric carboxylic acid | .04 |
| Carboxymethylcellulose | .14 |
| Pentane | 4.74 |
| | 100.00 |

Foams produced from this composition are softer than those containing metal cross-linking agents. They exhibit a slightly tacky surface after drying and are useful as soil-retentive coatings such as mop and dusting cloth treatments and coatings for shoe-cleaning mats.

EXAMPLE 19

Rodent-repellent foam

The following composition is prepared and packaged in an aerosol container:

Composition

| | |
|---|---|
| Acrylic emulsion polymer No. 1 (see Example 1) 50% NV | 34.0 |
| Water | 30.4 |
| Rodent repellent [1] | 24.2 |
| 1 molar zinc ammonium acetate solution | 5.1 |
| Ammonium hydroxide (28%) | 1.8 |
| Brown aqueous color dispersion | .7 |
| Propellant blend (83% isobutane/17% propane) | 3.8 |
| | 100.0 |

[1] Sold under the trademark Arasan 42–S.

Foam prepared from this composition is used as coatings wherever protection from rodents is desired. Because of its bark-like texture and brown color, the foam is especially suitable for application to tree trunks, bushes and the like. In a similar manner, other active ingredients, including insect repellents, insecticides, herbicides, etc., can be incorporated into the composition.

EXAMPLE 20

Collapsible tube composition

The following composition is prepared and packaged in a collapsible metal or plastic tube:

Composition

| | |
|---|---:|
| Acrylic emulsion tetrapolymer (as in Example 2) 50% solids | 60.00 |
| Water | 25.20 |
| Diethylenetriamine | 1.30 |
| Ammonium zirconyl carbonate solution (10% $ZrO_2$) | 9.40 |
| n-Hexane | 5.10 |
| | 100.00 |

The composition is a heavy paste having a consistency similar to toothpaste. It is expelled from the tube by squeezing to give a ribbon which spontaneously expands to a persistent foam. If desired, the ribbon of paste can be spread out or shaped prior to foaming. This composition is particularly useful for caulking, filling and patching, and can also be adapted to serve as an art medium.

EXAMPLE 21

Low-toxicity, low-odor art medium

The following composition is prepared and packaged in an aerosol container:

Composition

| | |
|---|---:|
| Acrylic emulsion polymer (as in Example 1) 50% solids | 82.2 |
| Water | 3.6 |
| Sodium lauroyl sarcosinate | 1.6 |
| Ethoxylated lauryl alcohol (25 mols ETO) | 1.5 |
| Coconut diethanolamide | 1.3 |
| Zinc oxide | 1.2 |
| Red color (erythrosene) | .1 |
| Difluorodichloromethane | 8.5 |
| | 100.0 |

This formulation dries very rapidly and is almost odorless. It is water resistant and dries to a flexible foam useful in painting, sculpting, and model building.

What is claimed is:

1. A composition suitable for preparing stable cellular foam structures, said composition consisting essentially of
    an emulsion of an acrylic polymer having a minimum film-forming temperature of less than about 25° C., said polymer containing (A) at least about 50%, by weight, of a soft monomer selected from the group consisting of alkyl esters of acrylic acid and higher alkyl esters of methacrylic acid, (B) from about 15 to about 45%, by weight, of a hard comonomer selected from the group consisting of methyl methacrylate, cyclohexyl acrylate, cyclohexyl methacrylate, styrene, and acrylonitrile, and (C) from about 5 to about 20%, by weight, of a carboxylic acid comonomer selected from the group consisting of methacrylic acid, acrylic acid, maleic acid, itaconic acid, and monoalkyl itaconates, and
    at least one complex of a polyvalent metal ion selected from the group consisting of zirconium, zinc, cadmium, copper and nickel with ammonia or a volatile amine, said complex being present in the amount of about 0.05 to 0.5 moles per equivalent of free carboxyl group in said polymer, and
    dispersed in said emulsion, a foam-forming amount of at least one volatile organic liquid having a vapor pressure of at least about 2 p.s.i.a. at about 20° C.
2. The composition of claim 1 wherein said polymer comprises at least about 15% by weight of said emulsion.
3. The composition of claim 1 wherein said soft monomer is ethyl acrylate, butyl acrylate or 2-ethylhexyl acrylate.
4. The composition of claim 1 wherein said organic liquid comprises about 1% to 15% by weight of said composition.
5. The composition of claim 1 wherein said organic liquid is a hydrocarbon or a halogenated hydrocarbon.
6. A self-pressurized composition suitable for preparing stable cellular foam structures, said composition consisting essentially of
    an emulsion of an acrylic polymer having a minimum film-forming temperature of less than about 25° C., said polymer containing (A) at least about 50%, by weight, of a soft monomer selected from the group consisting of alkyl esters of acrylic acid and higher alkyl esters of methacrylic acid, (B) from about 15 to about 45%, by weight, of a hard comonomer selected from the group consisting of methyl methacrylate, cyclohexyl acrylate, cyclohexyl methacrylate, styrene, and acrylonitrile, and (C) from about 5 to about 20%, by weight, of a carboxylic acid comonomer selected from the group consisting of methacrylic acid, acrylic acid, maleic acid, itaconic acid, and monoalkyl itaconates, and
    at least one complex of a polyvalent metal ion selected from the group consisting of zirconium, zinc, cadmium, copper and nickel with ammonia or a volatile amine, said complex being present in the amount of about 0.05 to 0.5 moles per equivalent of free carboxyl group in said polymer, and
    dispersed in said emulsion, from about 1% to 15%, by weight, based on the weight of said composition, of at least one volatile organic liquid having a vapor pressure between 15 and 140 p.s.i.a. at about 20° C.
7. The composition of claim 6 wherein said organic liquid is a liquefied hydrocarbon or halogenated hydrocarbon propellant selected from the group consisting of propane, n-butane, isobutane, dichlorodifluoromethane, difluoroethane, chlorodifluoromethane, chlorodifluoroethane, octafluorocyclobutane, dichlorotetrafluoroethane, chlorotrifluoroethane, and dichlorofluoromethane.
8. A composition suitable for producing cellular foam structures on a surface, said composition consisting essentially of
    an emulsion of an acrylic polymer having a minimum film-forming temperature of less than about 25° C., said polymer containing (A) at least about 50%, by weight, of a soft monomer selected from the group consisting of alkyl esters of acrylic acid and higher alkyl esters of methacrylic acid, (B) from about 15 to about 45%, by weight, of a hard comonomer selected from the group consisting of methyl methacrylate, cyclohexyl acrylate, cyclohexyl methacrylate, styrene and acrylonitrile, and (C) from about 5 to about 20%, by weight, of a carboxylic acid comonomer selected from the group consisting of methacrylic acid, acrylic acid, maleic acid, itaconic acid, and monoalkyl itaconates and
    at least one complex of a polyavalent metal ion selected from the group consisting of zirconium, zinc, cadmium, copper and nickel with ammonia or a volatile amine, said complex being present in the amount of about 0.05 to 0.5 moles per equivalent of free carboxyl group in said polymer, and
    dispersed in said emulsion, from about 1% to 15%, by weight, based on the weight of said composition, of at least one volatile organic liquid having a vapor pressure between about 2 p.s.i.a. and 15 p.s.i.a. at about 20° C.
9. The composition of claim 8 wherein said organic liquid is a hydrocarbon or halogenated hydrocarbon selected from the group consisting of hexane, pentane, trichlorofluoromethane and trichlorotrifluoroethane.

10. The composition of claim 8 wherein said organic liquid is present in the amount of about 3% to 6% by weight.

11. The process for producing cellular foam structures, which process consists essentially of applying to a surface a compossition consisting essentially of an emulsion of an acrylic polymer having a minimum film-forming temperature of less than about 25° C., said polymer containing (A) at least about 50%, by weight, of a soft monomer selected from the group consisting of alkyl esters of acrylic acid and higher alkyl esters of methacrylic acid, (B) from about 15 to about 45%, by weight, of a hard comonomer selected from the group consisting of methyl methacrylate, cyclohexyl acrylate, cyclohexyl methacrylate, styrene and acrylonitrile, and (C) from about 5 to about 20%, by weight, of a carboxylic acid comonomer selected from the group consisting of methacrylic acid, acrylic acid, maleic acid, itaconic acid, and monoalkyl itaconates and at least one complex of a polyvalent metal ion selected from the group consisting of zirconium, zinc, cadmium, copper and nickel with ammonia or a volatile amine, said complex being present in the amount of about 0.05 to 0.5 moles per equivalent of free carboxyl group in said polymer, and dispersed in said emulsion, a foam-forming amount of at least one volatile organic liquid having a vapor pressure of at least about 2 p.s.i.a. at about 20% C.

References Cited

UNITED STATES PATENTS

| | | | |
|---|---|---|---|
| 2,758,102 | 8/1956 | Grummitt et al. | 260—29.6 M |
| 3,202,638 | 8/1965 | Van Ess | 260—29.6 TA |
| 3,355,316 | 11/1967 | Hellman et al. | 260—2.5 L |
| 3,370,024 | 2/1968 | Grasko et al. | 260—33.8 U |
| 3,538,025 | 11/1970 | Roberts et al. | 260—2.5 L |

MURRAY TILLMAN, Primary Examiner

W. J. BRIGGS, SR., Assistant Examiner

U.S. Cl. X.R.

117—161 UT; 260—29.6 TA, 29.6 M, 33.6 UA, 33.8 UA